Aug. 6, 1935.  J. E. CADE  2,010,346
TRACTOR
Filed June 23, 1930
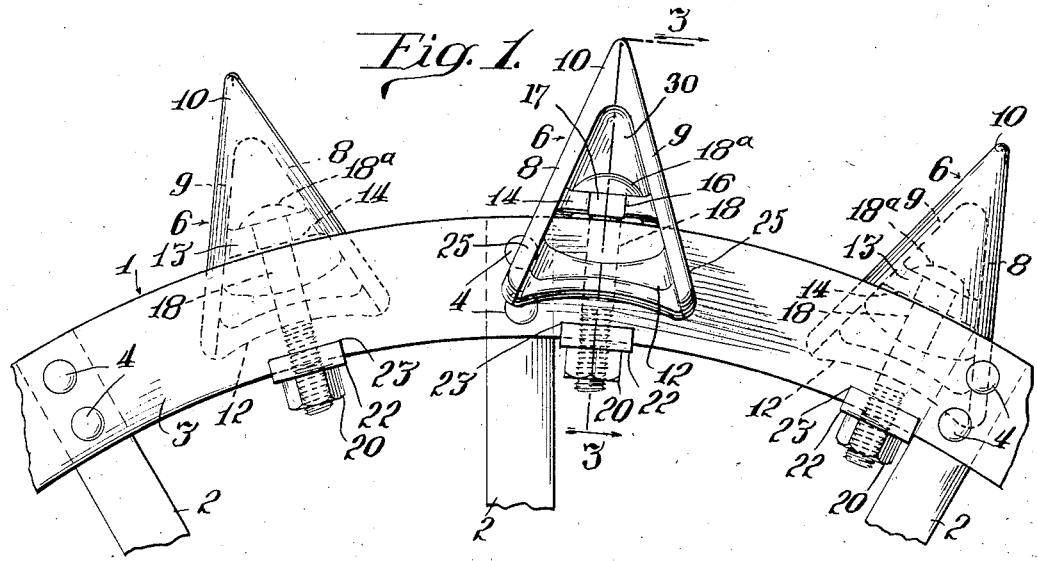
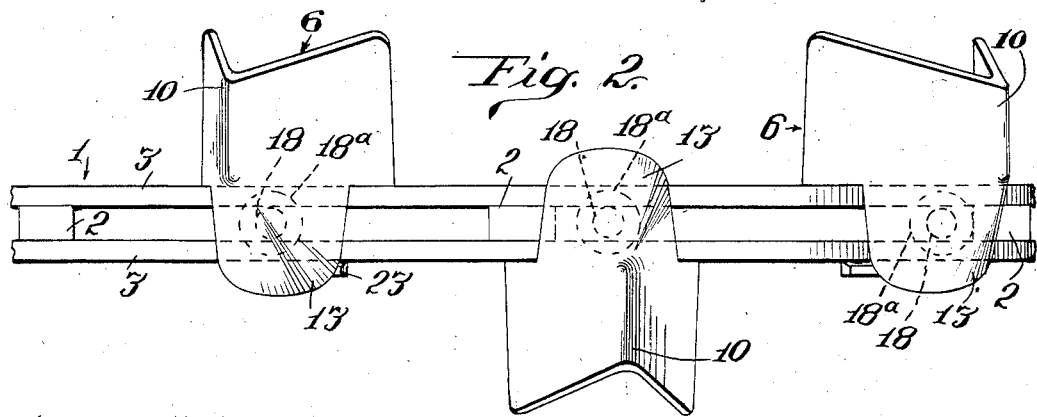
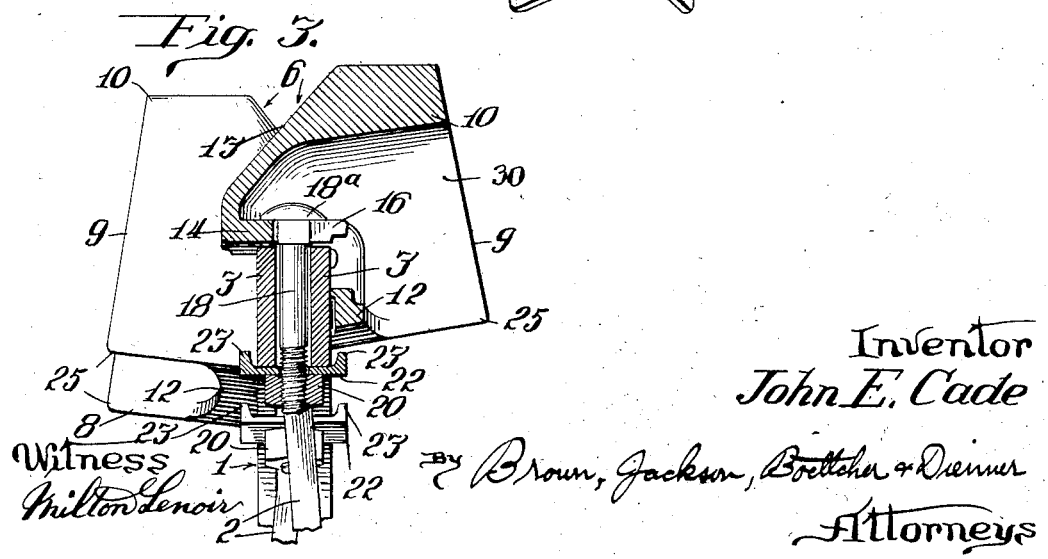
Inventor
John E. Cade
By Brown, Jackson, Boettcher & Dienner
Attorneys
Witness
Milton Lenoir Patented Aug. 6, 1935

2,010,346

UNITED STATES PATENT OFFICE 2,010,346

TRACTOR

John E. Cade, Waterloo, Iowa, assignor to John Deere Tractor Company, Waterloo, Iowa, a corporation of Iowa Application June 23, 1930, Serial No. 462,979

22 Claims. (Cl. 301—44)

The present invention relates, generally, to tractors of the motor driven type and, more particularly, to an improved traction wheel and lug therefor.

More specifically, the present invention has for one of its objects the provision of a novel type of ground gripping lug particularly adapted for narrow rimmed traction wheels. In some sections of the country soil conditions are such that the soil has a great tendency to pack and adhere to the traction wheels of tractors and other similar implements. The soil in these sections is heavy and sticky so that when damp or wet the traction wheels and lugs in common use prior to my invention become clogged with mud and earth between the rims and around the lugs so that after a short period of operation the traction wheel loses a greater part of its gripping power. Where the soil builds up in the wheel and around the lugs, the traction wheel thus losing the greater part of its effectiveness, considerable power is wasted, as will be readily understood.

The principal object, therefore, of the present invention is the provision of an improved wheel and lug structure in which there is little tendency for the soil to stick or adhere to the wheel or to or around the lugs attached thereto. More specifically, the present invention contemplates an improved lug structure which is strong and sturdy, yet inexpensive to manufacture and convenient in assembly. Another object of the present invention is the provision of an improved lug so constructed and arranged that there is little tendency for sticky soils to adhere thereto. Still further, another object of the present invention is an improved form of securing means for fixing the lug to a traction wheel.

Other objects and advantages of the present invention will be apparent to those skilled in the art after a consideration of the following detailed description of one preferred embodiment of the same taken in conjunction with the accompanying drawing, in which:—

Figure 1 is a fragmentary elevation showing a portion of the traction wheel having a rim and a plurality of spokes;

Figure 2 is a top view looking down onto the portion of the wheel and lugs substantially as illustrated in Figure 1; and Figure 3 is a cross-sectional view taken substantially along the line 3—3 of Figure 1 and looking in the direction of the arrows.

Referring now to the drawing, the reference 1 indicates, in its entirety, a traction wheel such as those used on motor driven tractors, grain binders, harvesters and the like, and is seen to comprise radially extending spokes 2 and a pair of parallel spaced rings 3 serving as a rim for the wheel 1. As best shown in Figure 2, the rings 3 are spaced apart just the thickness of the spokes 2. The rings 3 are secured to the other ends of the spokes 2 by means of rivets 4.

In order to secure traction and to prevent the wheel from sinking too far into the ground, the wheel 1 is provided with a number of ground gripping lugs 6 removably fastened to the rings 3. Preferably, the lugs are each in the form of a casting, each having a pair of inclined upwardly or radially outwardly converging walls 8 and 9 which are sloping relative to one another and which are thickened at their meeting or ground engaging edge, as indicated by the reference numeral 10. The inclined walls of each lug converge substantially radially outwardly of the rim or rings 3, or upwardly as viewed in Figures 1 and 3, and it is to be understood that wherever the terms "upwardly" and "radially outwardly" are used they are to be understood as being employed in this sense. These sloping sides or walls 8 and 9 are bridged together by a connecting section 12 preferably formed integral therewith adjacent the lower edge of each of the walls 8 and 9.

The lug casting is also provided with a third wall section 13 sloping downwardly and laterally with respect to the walls 8 and 9 to a point substantially midway thereof, at which point an intermediate bridging section or web 14 is provided, joined, preferably integrally, with the wall sections 8, 9 and 13. As best shown in Figure 1, the intermediate section 14 makes an equal angle with the walls 8 and 9. An opening 30 is formed under the edge 10 and between the walls 8 and 9, said opening being closed at one side by the section 13, as illustrated in Figure 3.

The under side of the intermediate section 14 is slightly arcuate in shape so as to fit the curvature of the rim 3 of the traction wheel. In addition, this section is slotted, as at 16, to receive the square portion 17 of a bolt 18 by which the lug 6 is bolted to the wheel. As best shown in Figure 3, the bolt 18 is of such dimensions that it fits closely between the rings 3 and is long enough to extend a short distance below the inner edge of these rings.

The lower end of the bolt 18 is threaded and is provided with a nut member 20 adapted to be screwed thereon to clamp the lug to the wheel. Interposed between the nut 20 and the inner edges of the rings 3 is a clip or U-shaped member 22 having upstanding flanges 23. The flanges 23 are provided for the purpose of centering the lower end of the bolt 18 between the rings 3, and the intermediate section of the clip 22 is made plane so as to provide an effective bearing surface for the under side of the nut 20.

As best shown in Figures 1 and 3, the side walls 8 and 9 are extended below the intermediate section 14, as indicated by the reference numeral 25 and as viewed in Figure 3, the bridging section 12 serving to connect and reenforce the walls 8 and 9 at this point. The portion 25 extends laterally beyond the plane of the ground engaging edge 10.

The walls 8 and 9 are interrupted beneath the intermediate section 14 to provide a notch for the reception of the rings 3 to allow the same to be brought into substantial contact with the intermediate section 14, as will be clearly understood from Figure 3. The connecting web or section 12 preferably lies adjacent the notches in the walls 8 and 9 and cooperates therewith in preventing lateral turning of the lug 6.

As will be noted from Figure 3, the meeting edges 10 of the walls 8 and 9 lie substantially to one side of the central plane of the wheel 1 while the offset laterally sloping section or wall 13 substantially overlies the periphery of the rings 3, the reentrant intermediate section 14 lying directly underneath the wall 13. If desired, the meeting or ground engaging edge 10 may be differently dimensioned or provided in different angular or peripheral positions relative to the rings 3 and the plane of the bolt 18 than is illustrated, in order to secure satisfactory traction in different kinds of soils. The lugs 6 are preferably secured to the wheel 1 in staggered relationship, adjacent lugs being placed on opposite sides of the wheel 1, as clearly shown in Figure 2.

It is to be understood that by virtue of the slot in the intermediate section 14, the lug 6 may be so formed that it will not be necessary to remove the bolt 18 in order to remove the lug from the wheel, all that is required being to loosen the nut 20 to back it off sufficiently to allow the lug 6 to be slipped from beneath the head 18a of the bolt 18.

From Figure 2 it will be seen that all of the surfaces in contact with the ground are smooth and practically free from all projections and the like, so that there is little tendency for wet and sticky soil to adhere to the rings 3 and the lugs 6, or to become caked or roll up thereon.

Any soil sticking or wedging in the opening 30 and around the walls 8 and 9 of the lug, adjacent the lower portion 25 thereof, will be removed upon further rotation of the wheel causing the lug to again engage the ground. The normal tendency is for earth to enter the opening 30 of the lug as a result of pressure, both direct and lateral, exerted on the lug as it enters the ground, but because the portions 25 extend laterally the entering movement of the lug tends to cause a substantially continual movement of soil through said openings 30 of corresponding lugs inwardly of the wheel. Such a movement tends to loosen any earth wedged between two adjacent lugs, and will thus tend to clean the lugs and prevent accumulation and wedging of earth and the like between lugs and resultant loss of traction efficiency. This is one of the important accomplishments of my lug.

While I have described in connection with the accompanying drawing the preferred embodiment of my invention, it is to be understood, however, that my invention is not to be limited to the specific structure shown and described, but that, in fact, widely different means may be employed in the practice of the broader aspects of my invention.

What I claim, therefore, and desire to secure by Letters Patent, is:—

1. In combination with a wheel having a rim, a traction lug comprising a casting having a pair of converging walls joined at the line of intersection, an intermediate web joining said walls below their intersection, said walls being notched below said web to receive the wheel rim, the lower part of said walls extending below said web and alongside one side only of said rim, a lower bridging connection joining the lower extending portions of said walls, said web being adapted to seat against said rim, and means connected with the web for securing the lug to the rim.

2. In combination with a traction wheel having a rim comprised of two spaced rings, a traction lug including a casting of triangular cross section having a pair of sloping walls and a third sloping wall meeting the other walls at an angle, an intermediate section joining all of said walls, said section making equal angles with said pair of walls and formed to engage with the periphery of the wheel rim, the latter walls extending in diverging relation beyond said intermediate section and having a lower connecting section adapted to contact with one side of the wheel rim, and means carried by said intermediate section for securing said lug to the rim.

3. A lug for a traction wheel, comprising a pair of sloping walls meeting one another at an earth contacting edge, the space between said walls and under said edge being substantially completely open at one side only, said walls having a lateral notch open at one side by which the lug is adapted to engage over the edge of a wheel rim, securing means engageable with the radially inner portion of said rim for fixing the lug to the wheel, and a third sloping wall joining said pair of walls above said notch.

4. In combination with a wheel having a rim, a traction lug, comprising a pair of sloping walls meeting one another at an earth contacting edge, a third wall inclined with respect to said pair of walls and sloping laterally thereof, the third wall having a reentrant portion formed to engage a circular wheel rim and connected with said pair of walls, said portion having an aperture therein, and securing means passing through the aperture and adapted to extend into the rim to fasten the lug to the wheel.

5. In combination with a wheel having a rim, a traction lug comprising a pair of sloping walls meeting one another at an earth contacting edge, a third wall inclined with respect to said pair of walls and sloping laterally thereof, said walls being thickened at their meeting edges, the third wall having a reentrant portion formed to engage a circular wheel rim and connected with said pair of walls, said portion having a slot centrally thereof and in parallel relation with said pair of walls, each of said latter walls extending beyond said reentrant portion and having a rim receiving recess formed therein and extending to said portion to allow the insertion of a rim therein, a strengthening web joining the pair of walls adjacent said recesses, and securing bolt means passing through the slot and adapted to extend into the rim to fasten the lug thereon.

6. In combination with a wheel having a rim, a traction lug comprising a rim contacting section and earth contacting portions, the latter being offset laterally so as to lie outside the central plane of the wheel and having extensions below said section adapted to engage the side of the rim of the wheel to prevent overturning of the lug, and means carried by said lug for securing the latter to the rim and extending in the central plane of the wheel.

7. In a traction wheel having a rim comprising two parallel rings, ground gripping lugs on the rim, each comprising an earth contacting portion extending substantially radially of the wheel and spaced from the central plane of the wheel, and a second portion contacting with the periphery of the rim, the earth contacting portion extending adjacent one side of the rim, and bolt means extending between both of said rings and reacting against the radially inner edge of each for securing the lugs to said parallel rings.

8. In a traction wheel, the combination of a rim comprising two parallel spaced apart rings, ground gripping lugs on the rim and extending radially outwardly of the wheel, each comprising a pair of inclined walls having an offset intermediate section joining the walls and formed to engage the periphery of said rings, said section having a slot, said walls extended to lie adjacent the side of one of the parallel rings, and securing means for the lug comprising a bolt passing through said slot and between the parallel rings, an apertured clip on the inner end of the bolt and embracing the inner edges of said ring, and a nut on the bolt.

9. In a traction wheel, the combination of a rim comprising two parallel spaced apart rings, ground gripping lugs on the rim and extending radially outwardly of the wheel, each comprising a pair of inclined walls having an offset intermediate section joining the walls and formed to engage the periphery of said rings, said section having a slot, said walls extended to lie adjacent the side of one of the parallel rings and provided with an integral section joining the extended portions of said walls, and securing means for the lug comprising a bolt passing through said slot and between the parallel rings, an apertured clip on the inner end of the bolt and embracing the inner edges of said rings, and a nut on the bolt, said integral section adapted to lie against one side of the rim.

10. A traction lug for a wheel, comprising a pair of sloping walls meeting one another at an earth contacting edge, a third wall inclined with respect to said pair of walls and sloping laterally thereof, the third wall having a reentrant portion formed to engage the rim of a wheel and connected with said pair of walls, said portion having an aperture therein, and securing means passing through the aperture and adapted to secure the lug to a wheel.

11. A hollow lug for a traction wheel, comprising a pair of sloping walls meeting one another at an earth contacting edge, a third wall inclined with respect to said pair of walls and sloping laterally thereof, said walls being thickened at their meeting edges, the third wall having a reentrant portion formed to be adapted to engage and conform to the wheel and connected with said pair of walls, said portion having a slot centrally thereof and in parallel relation with said pair of walls, each of said latter walls extending beyond said reentrant portion and having a rim receiving recess formed therein and extending to said portion to allow the insertion of the wheel rim therein, and a strengthening web joining the pair of walls adjacent said recesses, said slot being adapted to receive a bolt therethrough for fastening the lug to the ground engaging surface of a wheel.

12. A ground gripping lug adapted to be secured to a wheel rim, said lug comprising a pair of inclined walls, a third wall inclined with respect to said pair of walls, an offset intermediate section joining all of said walls, said section having a slot, said pair of walls extended so as to be adapted to lie adjacent the side of the rim and provided with an integral section joining the extended portions, and securing means passing through said slot and adapted to secure the lug to the rim.

13. In combination, a wheel having a rim, and a traction lug secured to said rim and outwardly thereof, said lug comprising a casting having a pair of upwardly converging walls joined at the line of intersection, an intermediate web joining said walls below their intersection, said walls being notched below said web to receive the wheel rim, the lower part of said walls extending below said web and alongside one side only of said rim, a lower bridging connection joining the lower extending portions of the walls, said web seating against said rim and having a slot therein, and means in said slot connecting said lug with said rim, the lower edges of said walls extending laterally beyond the intersection of the upwardly converging walls.

14. In combination, a wheel having a rim comprising two spaced apart rings, a traction lug secured thereto comprising a hollow casting having a rim contacting section and earth contacting portion, the portion being offset laterally so as to have a greater share lying laterally beyond the central plane of the wheel and beyond the plane of the rim, said portion having extensions below said section engaging one side only of the rim of the wheel, said section having a slot, and securing means for the lug comprising a bolt passing through said slot and between the parallel rings, an apertured clip on the inner end of the bolt and embracing the inner edges of said rings, and a nut on the bolt.

15. A traction wheel comprising, in combination, a rim of spaced apart rings, traction lugs on the rim and extending substantially radially outwardly of the wheel, each lug comprising an earth contacting portion spaced laterally substantially outside of the vertical plane of the rim, and a portion contacting the periphery of the rim, the earth contacting portion extending adjacent one side of the rim and laterally thereof beyond the ground engaging edge, and means securing the lugs in staggered relation to said rim, said means passing between said rings and connected with both.

16. In combination with a wheel having a rim comprising a ring, a traction lug comprising a hollow casting having a pair of walls converging radially outwardly of the wheel and joined at their line of intersection, a flat intermediate web joining said walls below their intersection and adapted to be seated on the ring, said walls being notched at one side below said web to receive the ring, the lower part of said walls extending below said web and along one side of the ring, and means cooperating with said flat web and extending parallel with and on the side of the ring opposite said lower part of the converging walls for securing the lug to the ring.

17. In combination with a wheel, a hollow traction lug comprising a pair of inclined side walls joined at a ground engaging edge; means connecting said walls below said edge and seated on the wheel rim and provided with means securing the lug to the wheel, said connecting means being positioned adjacent the axially inner end of said lug, and a third wall joining said connecting means, side walls and ground engaging edge and inclined relative to said connecting means, the lower extremities of said pair of inclined walls opposite said connecting means projecting axially outwardly of the wheel to which the lug is secured and extending axially outwardly beyond the corresponding end of the ground engaging edge whereby when the lug is forced into the ground during operation of the wheel to which attached the earth pressure tends to remove soil from the lug.

18. A hollow lug comprising a pair of side walls joined at a ground engaging edge, means disposed below said edge connecting one end of one of said walls with the adjacent end of the other wall, attaching means carried by said connecting means adjacent said ends of the walls, a third wall inclined relative to said connecting means and said edge and joining said connecting means, side walls and ground engaging edge, the portions of said side walls opposite the ground engaging edge extending therefrom beyond the connecting means at said connected ends of the walls, and the edges of the opposite ends of said walls being inclined oppositely to said third wall.

19. A hollow lug comprising a pair of side walls joined at a ground engaging edge, means serving as a rim-engaging base disposed below said edge and connecting one end of one of said walls with the adjacent end of the other wall, attaching means carried by said base means and extending substantially at right angles thereto and to said ground engaging edge, and a third wall inclined relative to said base means and said ground engaging edge and serving to join together said connecting base means, side walls and ground engaging edge and closing that end of the space between said side walls, the opposite end of said space being left open and the edges of said side walls at this end of said space being inclined oppositely to said third wall.

20. A hollow lug comprising a pair of side walls joined at a ground engaging edge, means serving as a rim-engaging base disposed below said edge and connecting one end of one of said walls with the adjacent end of the other wall, attaching means carried by said base means and extending substantially at right angles thereto and to said ground engaging edge, a third wall inclined relative to said base means and said ground engaging edge and serving to join together said connecting base means, side walls and ground engaging edge and closing that end of the space between said side walls, the opposite end of said space being left open and the edges of said side walls at this end of said space being inclined oppositely to said third wall, and rim-edge contacting means disposed below said third wall and extending at substantially right angles to said connecting base means.

21. A hollow lug comprising a pair of side walls joined at a ground engaging edge, wall connecting means disposed substantially midway between the ground engaging edge and the opposite edge of each of said walls, attaching means carried by said connecting means, and a third wall inclined relative to said connecting means and said edge and serving to join together said connecting means, side walls and ground engaging edge, the portions of said side walls opposite the ground engaging edge extending therefrom beyond the connecting means at said connected ends of the walls.

22. A hollow lug comprising a pair of side walls joined at a ground engaging edge, means disposed below said edge connecting one end of one of said walls with the adjacent end of the other wall, attaching means carried by said connecting means adjacent said ends of the walls, a third wall inclined relative to said connecting means and said edge and joining said connecting means, side walls and ground engaging edge, the portions of said side walls opposite the ground engaging edge extending therefrom beyond the connecting means at said connected ends of the walls, and means disposed on the side of said connecting means opposite said ground engaging edge for connecting said side walls.

JOHN E. CADE.